T. W. LEES.
VALVE.
APPLICATION FILED APR. 22, 1922.
1,423,340. Patented July 18, 1922.
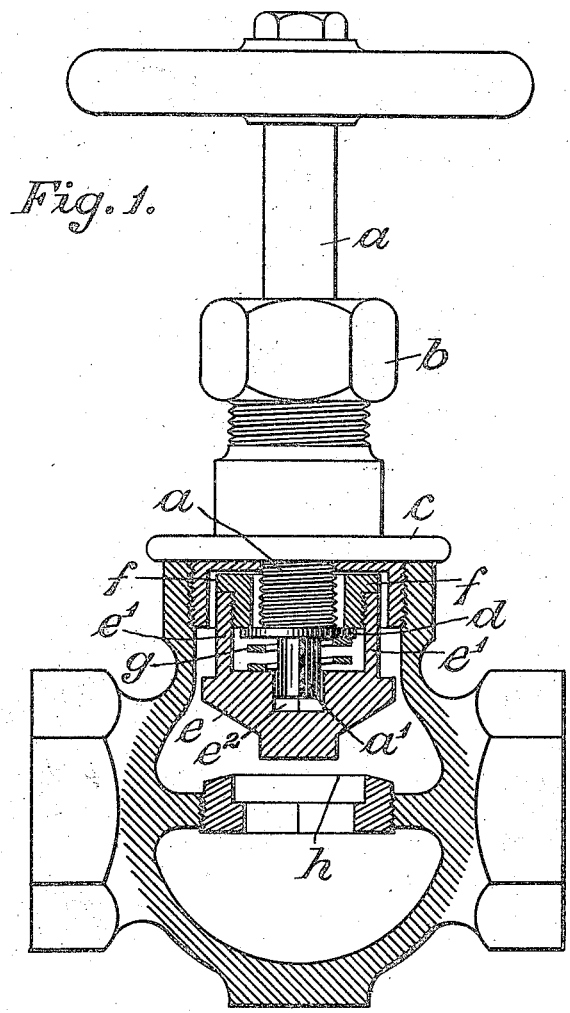
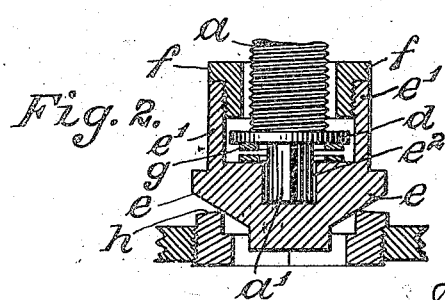

UNITED STATES PATENT OFFICE.

THOMAS WILLIAM LEES, OF HALIFAX, ENGLAND.

VALVE.

1,423,340.  Specification of Letters Patent.  Patented July 18, 1922.

Application filed April 22, 1922. Serial No. 556,098.

*To all whom it may concern:*

Be it known that I, THOMAS WILLIAM LEES, a subject of King George V of Great Britain, residing at Halifax, in the county of York, England, have invented a new and useful Improvement in Valves, of which the following is a specification.

My invention has reference to self grinding valves, for steam, water or other liquids or fluids, and the object of my invention is to provide a novel and improved construction of valve of this type.

The invention will be described with reference to the accompanying drawing in which:—

Fig. 1 shews a sectional elevation of a valve embodying the invention, whilst

Fig. 2 is a detail showing some of the parts in different position from Fig. 1.

According to my invention, I employ a screwed spindle $a$ working through a stuffing box and nut $b$ in the valve cover $c$ as ordinarily. At or near the lower end of the spindle I provide a collar or flange $d$ of suitable diameter, and below this collar the end of the spindle is made square as at $a'$. Alternatively the end of the spindle may be of angular section or be provided with a flat or flats for the purpose afterwards appearing.

The valve disc $e$ is provided on its upper side with an upwardly extending flange or hollow stem $e'$ screwed internally to receive a screwed annular member $f$ which slides loosely on the screwed spindle $a$. When the annular member $f$ is screwed home into the valve stem $e'$ its lower end is adapted to abut against the collar $d$ on the screwed spindle as shown, when the valve disc is not pressed on to the seat.

Surrounding the portion of the spindle $a$ beneath the collar $d$ is a coiled spring $g$ which, when the parts are associated, is confined between the collar and the upper side of the valve disc $e$.

In the upper side of the valve disc is a driving recess $e^2$ into which the squared or angular lower end $a'$ of the spindle extends, such recess being of a depth to permit of a certain amount of longitudinal movement of the valve disc relatively to the spindle.

When the valve is open, as shown in Fig. 1 the confined spring $g$ holds the disc $e$ in its lower-most or outward position relatively to the spindle $a$.

On closing the valve, the valve disc $e$ comes into contact with the seat $h$ and, by reason of the engagement of the angular end of the spindle in the recess named, the disc is rotated on the seat and is pressed against same by the action of the spring $g$. This rotation of the disc continues against a gradually increasing pressure of the spring until the screwing down of the spindle causes its lower end $a'$ to abut against the inner end of the recess $e^2$ in the disc, as shewn in Fig. 2, whereupon the disc is finally forced against the seat and held there by the direct pressure of the spindle.

On actuation of the spindle to open the valve, the disc is again held in contact with the seat and rotated thereon until the confined spring has regained its normal extension, when the collar on the spindle raises the disc from the seat by its engagement with the lower end of the member $f$.

It will be understood from the above description that the valve disc $e$, annular member $f$ and confined spring $g$ are all free to move together longitudinally of the spindle within the limit of compression of the spring. Actually, however, the end of the spindle is arranged to contact with the inner end of the recess in the valve disc as indicated in Fig. 2 before the spring has reached the full limit of compression.

The valve disc, annular member, and confined spring all rotate together both when opening and closing the valve, so that the only pressure to which the spring is subjected is that occasioned in a longitudinal direction when the valve disc is being forced against the seat.

The advantage presented by my invention over those constructions of self-grinding valve in which the spring is subjected to torsional strains, in one direction when the valve is being closed and in the reverse direction when it is being opened, will be apparent.

The details of construction of the parts may be varied.

Having thus described my invention, what I claim as new and desire to secure by Letters Patent is:—

1. A valve comprising in combination a casing, a stuffing box and nut in the upper part thereof, a screwed spindle working through said stuffing box and nut, a collar on said spindle, an annular member fitting loosely on the spindle, a seat opening, a valve disc adapted to close said opening having on its back a hollow stem into which the annular member is screwed, said member being adapted to engage the collar on the side remote from the disc, a spring confined on the spindle between the upper side of the disc and the collar and normally acting to hold the annular member against the collar, a driving recess in the upper side of the disc and a driving projection on the end of the spindle fitting in the recess, said recess being of such a depth as will permit of a certain longitudinal movement of the spindle relatively to the disc as the valve is being closed but will cause the end of the spindle to contact with the base of the recess before the spring is fully compressed.

2. A valve, comprising a valve casing provided with a valve seat, a revoluble valve disk for closing the valve seat provided with a hollow stem and an angular driving recess, an annular member secured to the upper part of the said hollow stem, a screw-threaded valve spindle revoluble in the valve casing and provided with an angular driving projection which engages in the said recess and slides longitudinally in it, said valve spindle having also a collar which bears against the lower end of the said annular member, and a spring interposed between the said collar and valve disk and holding them apart.

In testimony whereof I affix my signature.

THOMAS WILLIAM LEES.